United States Patent [19]

Krause et al.

[11] Patent Number: 5,760,154
[45] Date of Patent: *Jun. 2, 1998

[54] GRAFT COPOLYMERS OF UNSATURATED MONOMERS AND POLYHYDROXY COMPOUNDS, A PROCESS FOR THEIR PRODUCTION AND THEIR USE

[75] Inventors: Frank Krause, Kleve; Helmut Klimmek, Krefeld, both of Germany

[73] Assignee: Stockhausen GmbH & Co., KG, Krefeld, Germany

[*] Notice: The term of this patent shall not extend beyond the expiration date of Pat. No. 5,580,941.

[21] Appl. No.: 392,791

[22] PCT Filed: Dec. 16, 1994

[86] PCT No.: PCT/EP94/04187

§ 371 Date: Feb. 28, 1995

§ 102(e) Date: Feb. 28, 1995

[87] PCT Pub. No.: WO95/17444

PCT Pub. Date: Jun. 29, 1995

[30] Foreign Application Priority Data

Dec. 22, 1993 [DE] Germany ............... 43 43 993.4

[51] Int. Cl.⁶ ............... C06F 251/00; C14C 3/00; B01F 17/52; D06P 1/48
[52] U.S. Cl. ............... 527/311; 527/312; 527/313; 527/314; 527/315; 525/55; 525/59
[58] Field of Search ............... 527/311, 312, 313, 314, 315; 525/55, 59

[56] References Cited

U.S. PATENT DOCUMENTS

| | | | |
|---|---|---|---|
| 4,959,409 | 9/1990 | Heinzman et al. | 525/61 |
| 5,221,711 | 6/1993 | Heinzman et al. | 525/59 |
| 5,223,171 | 6/1993 | Jost et al. | 252/174.17 |
| 5,227,446 | 7/1993 | Denzinger et al. | 527/314 |
| 5,326,864 | 7/1994 | Besemer et al. | 536/123.1 |
| 5,580,941 | 12/1996 | Krause et al. | 527/300 |

*Primary Examiner*—Nathan M. Nutter
*Attorney, Agent, or Firm*—Evenson, McKeown, Edwards & Lenahan P.L.L.C.

[57] ABSTRACT

The present invention relates to water-soluble, acid groups-containing graft copolymers which are at least partially biodegradable and are based on polyhydroxy compounds and monoethylenically unsaturated carboxylic acids, sulfonic acids and/or phosphonic acids or the salts of said acids as well as optional further monomers. The present invention further relates to a process for producing said graft copolymers at temperatures of up to 200° C. by means of radical polymerization initiators, in that a total mixture is polymerized which consists of 1–60%-wt. of polyhydroxy compounds, their derivatives or their mixtures, and 95–40%-wt. of a monomer mixture comprising at least one monoethylenically unsaturated carboxylic acid, at least one monoethylenically unsaturated sulfonic acid, one monoethylenically unsaturated sulfuric acid ester and/or vinylphosphonic acid or the salts of said acids with monovalent cations, as well as optional further monomers. The present invention further relates to the use of the graft copolymers in aqueous systems, for binding multivalent metal ions, inhibiting the water hardness, as additive in detergents and cleaning agents, as textile auxiliary, dispersing agent, in particular for pigments, and as auxiliary agent in the production of paper and leather.

25 Claims, No Drawings

GRAFT COPOLYMERS OF UNSATURATED MONOMERS AND POLYHYDROXY COMPOUNDS, A PROCESS FOR THEIR PRODUCTION AND THEIR USE

The present invention relates to water-soluble, acid groups-containing graft copolymers which are at least partially biodegradable and are based on polyhydroxy compounds and monoethylenically unsaturated carboxylic and sulfonic acids as well as optional further monomers. The present invention further relates to a process for their production and to their use in aqueous systems. This includes, for example, the inhibition of the negative effects of water hardness, the dispersive action on pigments, the use in washing liquors and dye baths, as well as the use as auxiliary agents in the manufacture of paper and leather.

In these applications of the water-soluble polymers it is important to complex multivalent metal ions, to prevent hardness elements of the water from precipitating, to disperse pigments in a high concentration at a low viscosity, or to suspend soil particles during washing processes and prevent them from redepositing on the fabric.

Since ecological considerations have increasingly come to the fore in recent years, many of the efforts to develop new polymers have focused on their biodegradability. In particular, products whose application and disposal is effected in aqueous systems have been in the center of the interest. In some fields, for example, in the papermaking industry, degradable polymers, such as starches have therefore been used as binders more frequently; in other fields graft polymers of reproductive raw materials, such as starch or sugar, and of synthetic monomers have been developed. However, for many applications there are relatively high technical requirements, and the products based on renewable raw materials cannot meet these standards to the extent the purely synthetic polymers used until today do. An example thereof is the use of the polycarboxylates in mixed sizes for textile fibers; here a mixture of starch and polycarboxylate is frequently used as a compromise between degradability and sizing property.

Another important field of application for water-soluble polymers is the use in detergents and cleaning agents. In the last few years, the development on this sector has been determined by the replacement of polyphosphate constituents which—as is generally known—result in overfertilization of the waters and in the problems known as "eutrophication".

In addition to the primary cleaning effect, polyphosphates have a favorable secondary detergent behavior; they remove alkaline-earth metal ions from the washings, textiles and dirt, prevent precipitations of insoluble alkaline-earth metal salts on the textiles, and maintain the dirt in the washing liquor in suspended condition. In this manner incrustations and redepositions are suppressed even after several wash cycles. At present polycarboxylates, such as polyacrylic acids and acrylic acid/maleic acid copolymers, are used as substitutes for polyphosphates. This is due to their binding capacity for alkaline-earth ions and dispersing power for lime, which are characterized by the so-called Hampshire-test or its modifications according to Richter-Winkler [Richter, Winkler in Tenside Surfactants Detergents 24 (1987) 4].

In addition to said calcium-binding capacity and dispersive property, the hydrophilic suspending capacity according to K. Schulze, G. Schreier "Die Photometrische Bestimmung des hydrophilen Suspendiervermögens—ein Beitrag zur Beurteilung des Schmutztragevermögens in Waschflotten" (Hüls Information, Chemische Werke Hüls AG) is of particular importance for washing processes.

The hydrophilic suspending capacity is a standard for the soil-carrying capacity of detergent builders and is determined by turbidity measurements in an iron oxide suspension. The polycarboxylates commercially available at present have a very poor suspending capacity which is 10 to 20 times below that of sodium tripolyphosphate.

The problem of eutrophication could be answered with the use of polycarboxylates. However, biological degradation of these polymers takes place to a very limited extent, the degradation rates cited in literature amounting to between 1 and 10%. Indications to this respect can be found in the publications of J. Lester et al. "The partitioning of polycarboxylic acids in activated sludge", Chemosphere, Vol. 21, Nos. 4–5, pp 443–450 (1990), H. Schumann "Elimination von 14C-markierten Polyelektrol in biologischen Abwasserreinigungsprozessen", Wasser Abwasser (1991), pp 376–383, P. Berth "Möglichkeiten und Grenzen des Ersatzes von Phosphaten in Waschmitteln", Angewandte Chemie (1975), pp 115–142.

The introduction of large amounts of non-degradable compounds in the environment is critical from the ecological point of view. A solution of this problem offers the use of partially or completely biodegradable polymers, i.e., those demineralizable to carbon dioxide and water.

Polyhydroxy compounds of the type of glycerols, polysaccharides and polyvinyl alcohols are perfect products with respect to their known biodegradability, however, their application technological properties are insufficient. For this reason, efforts have been made to improve the properties of these polyhydroxy compounds by modification; EP 0 427 349 A2, for example, describes the incorporation of carboxyl groups into polysaccharides by means of oxidation.

The calcium-binding capacity of the so modified polysaccharide is improved, however, it fails to come up to the level of synthetic polycarboxylates. On the one hand, the polysaccharide gains calcium binding capacity, on the other hand however, it loses part of its original biodegradability. The graft copolymerization of carbohydrates and unsaturated carboxyl groups-containing monomers provides an alternative to the synthesis of at least partially degradable water-soluble polymers.

EP 0 324 595 A2 describes polyacrylate-free cobuilders formed by a very complicated multi-stage modification of polyhydroxy compounds, for example, based on polyvinyl alcohol. The polyhydroxy compounds are esterified in the presence of catalysts with an excess of maleic anhydride in anhydrous organic solvents, unreacted chemicals are separated, and another reaction with aminocarboxylic acids is carried out, and to obtain a compound which is purified from by-products precipitation reactions in organic solvents are carried out again. These products do neither represent a technical nor an economical solution for mass products to be used in detergents. This is due to the indicated, long reaction times of up to 48 hours, the complicated production method and to the susceptibility to hydrolysis. In addition, the product must not come into direct contact with alkaline or acidic detergent components owing to said susceptibility to hydrolysis.

Copolymers of unsaturated carboxylic acids with monosaccharides capable of forming enolates in alkaline solutions are known from DE 37 14 732 C2; they are partially biodegradable and their $CaCO_3$-binding ability is said to be within the scope of commercial polyacrylates. Glucose, fructose, mannose, maltose, xylose and galactose are primarily mentioned as useful monosaccharides capable of forming enolates. The production method involves a high technical expenditure and is complicated since the final product of this manufacturing process is the sediment resulting from the acid precipitation but not the original polymer solution. Moreover, the precipitated polymer comes up as a slimy, difficultly isolable sediment in a difficulty separable form.

Radically initiated graft copolymers of mono-, oligo- or polysaccharides with a combination of unsaturated mono- and dicarboxylic acids used as detergent additives are known from DE 40 03 172 A1; they are said to be at least partially biodegradable. In addition, the graft polymers are attributed to have a comparable or even superior incrustation-inhibiting action in textile detergents, as compared to that of the known saccharide-free polymers of unsaturated mono- and dicarboxylic acids, e.g., described in EP 0 025 551 B1. As is generally known to the skilled artisan, the dicarboxylic acids specified as formulation component in DE 40 03 172 A1 are difficult to polymerize; in addition, the partial loss of carboxyl groups caused by the escape of carbon dioxide during polymerization is another disadvantage. Said carbon dioxide separation is described in literature, for example, by BRAUN in Makromol. Chemie 96 (1966) 100–121 and TATE in Makromol. Chemie 109 (1 967) 1 76–1 93; it means that the process involves an economic loss. In addition, the polyelectrolyte is less effective due to the partial loss of the carboxyl groups. Although the polymers according to DE 40 03 172 A1 are eliminated by sewage sludges, there are no clear indications as to their biodegradation.

Japanese patent application No. JP-A-61-31497 describes the use of a graft polymer as biodegradable detergent component. Said graft polymers are composed of polysaccharides of the starch, dextrin or cellulose type and water-soluble monomers; water-soluble monomers having carboxyl groups being preferred with particular preference for (meth)acrylic, itaconic, maleic or fumaric acid. Graft polymers of dextrin and acrylic acid are described in the application examples, and the dextrin contents amount to 67 to 34%-wt. The biodegradability was tested according to the MITI-guidelines; it was in the range between 42 and 10%, i.e., be the content of the natural material in the graft polymer. No indications are given with respect to the calcium-binding ability and the resistance to hard water. Despite a very large graft polymer quantity of 20%-wt., the cleaning efficiency of a detergent containing said graft polymers only came up to the level of a comparative detergent which contained zeolite in an amount corresponding to that of the graft polymer.

EP 0 465 287 A1 describes a detergent composition which, among others, comprises a graft polymer as builder; this is composed of synthetic polydextrose and an unsaturated water-soluble monomer. Express preference is given to the monomers (meth)acrylic acid alone or combined with maleic or itaconic acid. The examples merely mention graft polymers of polydextrose and acrylic acid; in a washing test carried out in comparison to zeolite the incrustation reduction amounted to 46%. This is far worse than the results obtained in washing tests with the graft polymers according to DE 40 03 172 A1, here incrustation inhibitions of up to 57% had been achieved.

Consequently, the graft polymers according to EP 0 465 287 A1 and JP-A-61-31497 have an inferior detergent effect as compared to the polymers according to DE 40 03 172 A1. There is no comparable data available to make a judgment with respect to the calcium-binding capacity or the inhibition of hard water elements of the described graft polymers. However, since both properties have a considerable influence on the detergent action, one may assume that the polymers according to DE 40 03 172 A1 are superior in this respect, too.

Accordingly it is the object of the present invention to produce graft copolymers with polyhydroxy compounds by means of a simple technical process under avoidance of decarboxylating monomers, said graft copolymers having an improved hydrophilic suspending capacity and an increased efficiency with respect to the property of complexing multivalent metal ions. In addition they are good inhibitors for water hardness and have dispersive properties for substances in aqueous systems.

According to the present invention this object is achieved by a copolymer of polyhydroxy compounds, their reaction products and/or their derivatives and a monomer mixture having the following composition:

A) 45–96%-wt. monoethylenically unsaturated C3-C10-mono-carboxylic acid alone or in admixtures with one another and/or its salts with monovalent cations, B) 4–55%-wt. of monoethylenically unsaturated monomers comprising monosulfonic acid groups, monoethylenically unsaturated sulfuric acid esters, vinyl phosphonic acid and/or the salts of these acids with monovalent cations, C) 0–30%-wt. of water-soluble, monoethylenically unsaturated compounds modified with 2–50 moles of alkylene oxide per mole, D) 0–45%-wt. of other water-soluble, radically polymerizable monomers, E) 0–30%-wt. of other radically polymerizable monomers which are slightly soluble or insoluble in water, with the sum of polymerization components A to E always amounting to 100%-wt.

F) The portion of polyhydroxy compounds amounts to 1–60%-wt., relative to the total mixture (sum of A to F).

According to the present invention polyhydroxy compounds are mono-, di-, oligo-, and polymeric glycerols or their admixtures, partially or completely saponified polyvinyl alcohols resulting from polyvinyl esters or polyvinyl ethers, or from vinyl ether copolymers or vinyl ester copolymers by saponification or hydrolysis, as well as polysaccharides of a vegetable, animal, microbial, or synthetic origin. Examples of polysaccharides include starch, cellulose, locust bean gum, dextran, guar gum, xanthan, xylan, pectin, alginate, and chitin as well as synthetic polydextrose. The use of starch and cellulose is preferred for commercial reasons. Additionally, modified polysaccharides are preferably used because of the improved solubility. These are polysaccharides the molecular weight of which has been modified by thermal, mechanical, enzymatic, oxidative, or acid-catalytic action (reaction products), or those transformed to derivatives by means of chemical modification, such as esterification, etherification, hydrogenation, and reglycosylation. Examples thereof include white and yellow dextrins, maltodextrins, oxidized and acidically decomposed starches, carboxymethyl starch, dialdehyde starch, cationic, anionic and neutral ethers and esters of cellulose and starch. Exceptions thereof are sugars and sugar derivatives as well as oligomers having 1 to 6 monosaccharide units, such as those described in the unpublished German patent application No. P 42 21 381.

According to the present invention mixtures of the stated polyhydroxy compounds with mono- or oligosaccharides or their derivatives may also be used as polyhydroxy compounds.

It is also possible that the polymers according to the present invention comprise derivatives with polyhydroxy compounds, which are formed from the stated polyhydroxy compounds and other components of the monomer mixture in the course of the manufacturing process.

Additional derivatives of polyhydroxy compounds which may advantageously be used include sugar acids, such as glucaric acid, tartaric acid, ascorbic acid, or other polyhydroxy carboxylic acids, such as dimethylhydroxypropionic acid, as well as esters of carboxylic acids or hydroxycarboxylic acids, e.g., tartaric acid esters or citric acid esters of polyglycerol, sugar alcohols, sugar carboxylic acids, mono- and oligosaccharides, hydrogenated and/or chemically modified mono- and oligosaccharides, amino sugars, triethanolamine, trishydroxyethylmelamine.

Additional polyhydroxy compounds which may be used include mono- or difatty acid esters of polyhydroxy compounds, such as glycerol, polyglycerol, of derivatives of hydrogenated sugars, anhydro compounds, e.g., sorbitan or anhydrosorbitol. Examples thereof include sorbitan monooleate, sorbitan palmitate, sorbitan stearate or isostearate, sorbitan laurate, sorbitan sesquioleate, polyoxyethylene oleate, polyoxyethylene and polyoxypropylene sorbitol, and triglycerol monolaurate and triglycerol stearate.

It is frequently advantageous to use polysaccharides exhibiting a combined modification of molecular weight reduction and chemical modification, or to use mixtures of different polyhydroxy compounds.

Suitable monoethylenically unsaturated C3 to C10 monocarboxylic acids mentioned under A) include acrylic acid, vinylacetic acid, 3-vinylpropionic acid, methacrylic acid, crotonic acid, dimethacrylic acid, 2-pentenoic acid, 3-hexenoic acid, and 2-hexenonic acid, their alkali and/or ammonium and/or amine salts, as well as corresponding mixtures. Methacrylic, acid, acrylic acid and vinylacetic acid are preferred; acrylic acid and methacrylic acid are particularly preferred.

Among the sulfonic acid-containing monomers and the mono-ethylenically unsaturated sulfuric esters mentioned in group B) the following ones are particularly preferred: vinyl-, allyl- and methallyl sulfonic acid and acrylamidomethylpropane sulfonic acid, styrene sulfonic acid as well as sulfuric acid esters of hydroxyethyl(meth)acrylate or of olefinically unsaturated alcohols, e.g., allyl- and methallyl sulfate and/or their alkali and/or ammonium and/or amine salts.

The monomers mentioned under C) are: polyglycol ethers and polyglycol esters and/or esters of (meth)acrylic acid and (meth)allyl alcohol, which may optionally be capped at one end. Examples thereof include an allyl alcohol etherified with 10 moles of ethylene oxide and a methoxypoly(ethylene glycol)methacrylate with 20 ethylene oxide units.

Because of their functionality the monomers mentioned under D) have a molecular-weight-increasing property; this is achieved by a higher degree of polymerization or by branching and cross-linking. For this reason, suitable monomers are those being readily polymerizable as well as those having two or more ethylenic double bonds acting as bifunctional cross-linking agents, or monomers having an ethylenically unsaturated double bond and another functional group. Examples thereof are: acrylamide, allyl methacrylate and glycidyl methacrylate.

Examples of monomers according to E) include: alkyl- and/or hydroxyalkyl(meth)acrylic ester, mono- and dialkyl ester of maleic acid, as well as N-alkyl- and N,N-dialkyl-(meth)acrylamide and vinylcarboxylic acid ester, e.g., methyl-, ethyl- and butyl(meth) acrylates, the corresponding hydroxyethyl-, -propyl-, -butyl-(meth) acrylates, N-methyl-, N-dimethyl-, N-tert.-butyl- and N-octadecyl acrylamide, maleic acid mono- and diethylesters as well as vinyl acetate and vinyl propionate, provided that the copolymers produced are water-soluble.

The above listing of the special polyhydroxy compounds and special monomers is illustrative only and shall not be understood as limitative.

The polymers according to the present invention may be obtained in solution or suspension according to polymerization methods known per se.

Preferably, the polymerization of the monomers is carried out in aqueous solution. The polymerization is initiated by means of polymerization initiators dissociating into radicals. Redox systems and thermally decomposing radical formers or combinations thereof may be used, including catalyst systems which can be initiated by irradiation.

Above all, peroxides are suitable initiators, hydrogen peroxide, t-butyl hydroperoxide, peroxodisulfates and their combinations being preferred. The initiators are combined with reducing agents known per se, e.g., sodium sulfite, hydrazine, heavy metal salts, and others. Depending on the polymerization performance, the initiator system may be added continuously or in portions or with changing pH-values. The molecular weights may be influenced in known manner by means of regulators, such as mercapto compounds.

The graft copolymerization may be carried out under adiabatic or isothermic conditions, the reaction being carried out such that part of the monomer mixture is prepared, the polymerization started and the monomer mixture metered then. The polyhydroxy component is added either completely to the premixed material or dosed together with the monomer mixture, or one part thereof is prepared and the other part dosed. The temperature during copolymerization may vary within a wide range. This range is between 0° C. and 200° C. Depending on the initiators to be employed, optimum temperatures may be between 10° C. and 150° C., preferably between 20° C. and 120° C. It is possible to carry out the polymerization at the boiling point of the solvent at reduced or increased pressure.

Polymerization under adiabatic conditions is preferred. In this case the polymerization is suitably started at low temperatures, e.g. at 25° C. The final temperature reached by the liberating polymerization heat depends on the monomers used and on the concentration ratios, and, in case of an adequate pressure, it may amount to up to 180° C., for example.

During copolymerization the pH of the reaction mixture may vary within wide ranges. Advantageously, the copolymerization is conducted at low pH-values, for instance such that the acrylic acid used is not or only partially pre-neutralized and that adjustment to neutral (pH 7–8) is effected only at the end of the polymerization, if necessary. If polysaccharides are used, the final neutralization may cause discolorations of the polymer. This may be prevented by a neutralization of the acidic monomers prior to polymerization. The copolymerization behavior of the monomers must always be ensured by the pH adjustment.

The graft copolymers according to the present invention may be manufactured in a continuous or discontinuous procedure. Production and properties of the graft copolymers according to the present invention will be illustrated in the following examples. In particular, it will be shown that the polymers according to the present invention—as compared to the prior art—have both a superior hydrophilic suspending capacity and an increased binding capacity for multivalent cations and, in addition, cause a considerable retardation of the precipitation of insoluble calcium and magnesium salts.

The graft copolymers according to the present invention may be used as dispersing and complexing agents. They bind multivalent metal ions in water-soluble complexes. They serve to inhibit water hardness. They are auxiliary agent and component in detergents, cleaning agents and washing and dye liquors, in particular they are excellently suitable as co-builders.

The graft copolymers according to the present invention have a good biodegradability and may excellently be used in textile detergents, dish washing agents, limestone and boiler scale removing agents, water treatment agents, and textile auxiliaries. The graft copolymers may be used in aqueous solution, as a powder or granulate.

The following Table indicates the usual amounts (percentage by weight) of the graft copolymers used in detergents and cleaners.

| Washing-powder (textiles) | 3 to 30% |
|---|---|
| Water softener | 5 to 30% |
| Cleaning agents (e.g. household cleaners) | 1 to 5% |
| Dish washing agents (machine) | 5 to 25% |

By way of example the following—merely illustrative but not limitative—formulations for detergents and cleaning agents can be given:

| Washing-powder | A | B |
|---|---|---|
| alkyl benzene sulfonate, Na-salt | 8% | 6% |
| fatty alcohol ethoxylate | 5% | 5% |
| soap | 3% | 5% |
| zeolite A | 25% | — |
| sodium carbonate | 15% | 25% |
| sodium metasilicate | 5% | 5% |
| magnesium silicate | 1% | — |
| sodium perborate | 20% | 15% |
| graft copolymers | 5% | 10% |
| sodium sulfate, water, others | ad 100% | ad 100% |
| Dish washing agents (machine) | | |
| surfactant, low-foaming | | 2% |
| sodium metasilicate | | 50% |
| sodium carbonate | | 5% |
| graft copolymers | | 5% |
| sodium sulfate | | ad 100% |
| Clear rinse | | |
| surfactant, low-foaming | | 10% |
| graft copolymers | | 5% |
| isopropanol | | 10% |
| cumene sulfonate | | 2% |
| water | | ad 100% |
| Dish washing agents (manual) | | |
| paraffin sulfonate, Na-salt | | 20% |
| fatty alcohol ether sulfate, Na-salt | | 5% |
| betaine | | 3% |
| graft copolymers | | 2% |
| water | | ad 100% |
| All-purpose cleaners | | |
| paraffin sulfonate, Na-salt | | 5% |
| fatty alcohol ethoxylate | | 5% |
| isopropanol | | 5% |
| graft copolymers | | 1–3% |
| water | | ad 100% |
| Toilet cleaners | | |
| fatty alcohol sulfate | | 25% |

| Washing-powder | A | B |
|---|---|---|
| powdery soap | | 5% |
| fatty alcohol ethoxylate | | 20% |
| graft copolymers | | 3% |
| sodium bicarbonate | | 20% |
| fragrance oil | | 5% |
| sodium sulfate | | ad 100% |

The polymers according to the present invention can advantageously be used as auxiliary agents in the finishing of textiles or textile materials. For example, in the boiling off or kier scouring of cotton, where they bind the hardening substances and disperse the accompanying substances of cotton or impurities, respectively; redeposition thereof is prevented and the action of surfactants supported. The polymers according to the present invention are used as stabilizers in hydrogen peroxide bleaching and, if stabilizing silicates are used additionally, they prevent silicate depositions.

The polymers according to the present invention may also be used as auxiliary agent in continuous and discontinuous washing and dyeing liquors, thereby the unfixed dye is removed and good fastnesses to washing, water and crocking or rubbing are achieved. In the case of polyester fibers, the dispersive action of the polymers causes the separation of dissolving oligomeric polyester components which disturb the dyeing process.

In the case of cellulose dyeing, the polymers according to the present invention promote the solubility of reactive and direct dyestuffs and result in an improved levelness of the dyestuff on the fibers, in particular when large amounts of salts are present in the liquor. In vat dyeing they can advantageously be used as dye-stuff pasting agent or as dispersant in the pigmentation bath. In sulfur dyeing they support the dyestuff dispersion and prevent bronzing.

In the dyeing of synthetic fibers the polymers according to the present invention prevent the formation of agglomerates of disperse dyestuffs, thus avoiding deposits in the cones.

When vat dyes and prints are washed-off, the polymers according to the present invention bind unfixed dyestuff components, and redeposition is reduced to a considerable extent. Due to the increased dyestuff diffusion to the washing liquor, the polymers provide for an optimum removal of unfixed dyes with a saving in water and energy.

For this reason, the products according to the present invention represent an effective substitute for polyphosphates in the after-treatment of naphthol dyeings; when reactive prints are washed-off, calcium alginate is prevented from precipitating.

The dispersing and complexing action of the polymers according to the present invention takes effect without remobilizing heavy metal compounds, both from dyestuff chromophores (reactive and metal complex dyes) and from water-insoluble, naturally or industrially resulting deposits.

The quantities required can be reduced in practice by an amount that is about three to five times less than that necessary when using conventional auxiliary agents, such as polyacrylates.

The polymers according to the present invention may be used in combination with surfactants, in particular anionic surfactants, in non-neutralized form (as acidic adjustment) in combination with complexing organic acids, such as citric acid, lactic acid, gluconic acid and phosphonic acids and surfactants, in particular anionic surfactants.

Such combinations are advantageously used, for instance, instead of the conventional multi-stage pretreatment which is effected in separate baths, for example, to treat highly-loaded cotton or linters, including the steps of acid extraction, chlorite bleach, boiling and H$_2$O$_2$-bleach; this is effected in such a manner that the pretreatment is carried out in only one adjustable treatment bath with the addition of the polymers according to the present invention.

This method according to the present invention can also be applied to continuous processes. Said methods prevent the formation of undesired organic halogen compounds and the respective environmental impacts.

The polymers are suitable additives to desize fiber sizes which are sensitive to hardness of water, e.g. polyester sizes.

In the leather manufacture the polymers according to the present invention result in an increased chromium up-take through the leather during the chrome tanning, and in retanning they contribute to properties with respect to fullness and softness of the leather.

Because of their dispersing and heavy-metal-complexing but not remobilizing properties the polymers according to the present invention can advantageously also be used as auxiliary agent in papermaking, for instance, in the bleaching of cellulose and other fibrous materials, in the production of dispersions of pigments and fillers, such as kaolin, calcium carbonate, satin white, talcum, titanium dioxide, aluminum hydroxide, and barium sulfate, as well as in the production of coating colors. Thereby filler and pigment slurries as well as coating colors having a high solids content and a high storage stability are obtained.

The polymers according to the present invention may be used in combination with other auxiliary agents.

Owing to the fact that the polymers according to the present invention have a high efficiency which results in low dosages and a good biodegradability, the products have a high ecological acceptance.

The polymerization reactions carried out in the following examples and comparative examples were conducted in a 2-liter-reaction flask equipped with stirrer, reflux condenser, thermometer, and metering devices for liquid and gaseous substances.

EXAMPLE 1

In the polymerization reactor the following components are mixed and then cooled to 15° C.: 248.9 g acrylic acid, 133.2 g dist. water, 64.0 g 50% sodium hydroxide solution, allyl sulfonate, 201.8 g of a 25% aqueous solution of MOWIOL 5-88 (polyvinyl alcohol of HOECHST), and 107.6 g of aqueous solution of methoxy polyethylene glycol methacrylate (20 mole EO). Polymerization is started by adding 20 mg iron(II)-sulfate, dissolved in 1 7.8 g dist. water, 4.0 g sodium disulfite, and 5 g tert.-butyl hydroperoxide (70%), dissolved in 17.8 g dist. water. Within 2 minutes, the temperature rises to 65° C. The temperature is then increased to 75° C. by means of a heating bath and the dosage of a second initiator system consisting of the components 17 g t-butyl hydroperoxide (70%), dissolved in 66.7 g dist. water, and 10 g sodium disulfite, dissolved in 66.7 g dist. water, is started over a period of 1.5 hours. When the dosage is completed, stirring is continued for another 30 minutes, followed by cooling and neutralization with 163.6 g 50% sodium hydroxide solution. The polymer has a dry substance of 43.1% and a turbid appearance; in this condition the turbidity is stable and disappears on dilution. The residual content of acrylic acid amounts to 20 ppm, that of methallyl sulfonate to 0.2%, the average molecular weight amounts to Mw=29128.

EXAMPLE 2

212.1 g acrylic acid, 200.0 g dist. water, 75.0 g sodium methallyl sulfonate, 54.5 g 50% sodium hydroxide solution, and 1 50.0 g triglycerol are placed into the polymerization reactor; at a temperature of 24° C. 5.9 g mercaptoethanol, 26 mg iron(II) solved in 10 g dist. water, and 4 g hydrogen peroxide (35%), dissolved in 1 0 g dist. water, are added. Polymerization starts spontaneously, reaches 101° C. after 4 minutes and drops again. At a temperature starting from 75° C., a second initiator system consisting of 1 0.7 g sodium persulfate, dissolved in 50 g 10.7 g sodium disulfite, dissolved in 50 g water, is metered thereto over a period of 1.5 hours. At the end of the dosage, stirring is continued for 30 minutes, followed by cooling and neutralization with 139.4 g 50% sodium hydroxide solution. The colorless, clear final product has a pH-value of 5.8 and a dry substance contents of 52.8%, the residual content of acrylic acid amounts to 15 ppm, the average molecular weight amounts to Mw=5907.

EXAMPLE 3

Example 2 is repeated, except for the initiators. The polymerization start is initiated by 20 mg iron(II)-sulfate, dissolved in 10 g dist. water, 3 g sodium disulfite, and 4 g t-butyl hydroperoxide (30%), dissolved in 109 dist. water, with the temperature rising from 20° C. to 98° C. The second initiation which is to be conducted as in Example 1 consists of 12 g t-butyl hydroperoxide (70%), dissolved in 50 g dist. water, and 9 g sodium disulfite, dissolved in 50 g dist. water.

The final product is a clear, colorless solution having a dry substance contents of 51.4% and a residual content of acrylic acid of 10 ppm, the average molecular weight amounts to Mw=11480.

EXAMPLE 4

Example 1 is repeated with the exception that the polyvinyl alcohol solution is replaced by 50.4 g triglycerol and that the water amount is increased to 284.6 g.

The clear, colorless final product has a content of solids of 43.2%, a residual content of acrylic acid of <1 0 ppm and of methallyl sulfonate of 0.16%. The average molecular weight amounts to Mw=23540.

EXAMPLE 5

Modifying Example 4, the amount of triglycerol is increased to 194.6 g and the initiation is effected as follows: start of polymerization with 10 g mercaptoethanol, 30 mg iron(II)-sulfate, and 6 g sodium disulfite, dissolved in 17.8 g dist. water, and 8 hydroperoxide (70%), dissolved in 17.8 g dist. water. The second initiation to be conducted as in Example 1 is effected with 14 g sodium persulfate, dissolved in 66 g dist. water, and 10 g sodium disulfite, in 66 g dist. water.

The clear, colorless final product has a content of solids of 50.3%, a residual content of acrylic acid of 10 ppm and of methallyl sulfonate of 0.3%. The average molecular weight amounts to Mw=3470.

EXAMPLE 6

Modifying Example 3, the triglycerol is replaced by 150.8 g of the starch dextrin maltodextrin MD 20 (from AVEBE), and the initiation of the polymerization start is effected after addition of 10 g mercaptoethanol with 20 mg iron(II)-sulfate and 3 g sodium disulfite, dissolved in 10 g dist. water, and 4 g t-butyl hydroperoxide (70%), dissolved in 10 g dist. water. In the initiation to be carried out as in Example 110 g sodium persulfate and 10 g sodium disulfite, each dissolved in 50 g dist. water, are used.

The final product is a clear solution having a dry substance contents of 54.7% and a residual content of acrylic acid of <20 ppm. The average molecular weight amounts to Mw=2996.

EXAMPLE 7

212.1 g acrylic acid, 284 9 dist. water, 54.5 g 50% sodium hydroxide solution, 1 94.6 g maltodextrin MD 20 (starch dextrin from AVEBE), and 75 g sodium methallyl sulfonate are dissolved with one another; at 1 5° C. 20 mg iron(II)-sulfate and 4 g sodium disulfite, dissolved in 17.8 g dist. water, and 5 g t-butyl hydroperoxide (70%), dissolved in 17.8 g dist. water, are added. Within 4 minutes, the temperature rises to 70° C., over a period of 1.5 hours dosage of the second initiation is started, it consists of the solutions of 14 g sodium persulfate and 10 g sodium disulfite, each in 66 g dist. water. Afterwards stirring is continued for 30 minutes and neutralization with sodium hydroxide solution effected after cooling. The slightly turbid polymer has a dry substance contents of 49.9%, a residual content of acrylic acid of<20 ppm and of methallyl sulfonate of 0.18%. The average molecular weight amounts to Mw=26225.

EXAMPLE 8

Example 3 is repeated with the modification that 2 g allylglycidyl ether is additionally used in the formulation and that 1 2 g sodium persulfate and 10 g sodium disulfite, each dissolved in 50 g dist. water, are used in the second initiation stage to the carried out as in Example 1.

The colorless, clear polymer has a dry substance contents of 52.8% and a residual content of acrylic acid of<20 ppm; the average molecular weight amounts to Mw=14872.

Comparative Example 1
(according to DE 37 14 732 C2, Example 2)

108 g acrylic acid is neutralized with 300 g 20% sodium hydroxide solution. 91 g glucose is dissolved in 100 g water and mixed with 49 g 35% H2O2-solution. 100 g water is heated to 85° C. in the reaction vessel, and the acrylic acid and glucose solution is run in within 90 minutes, the pH is kept at 9.0. 10 minutes after termination of the dosage, the temperature in the reaction vessel suddenly rises to 103° C. and the polymer discolors into yellow. Cooling is performed subsequently. The polymer solution has a solids content of 30.6% and a viscosity of 220 mPa.s. By adding hydrochloric acid, the polymer can be precipitated in the form of a slimy precipitate which is difficult to separate.

Comparative Example 2
(according to DE 40 03 172 A1, Example 21)

243 g water, 160 g saccharose, 47.9 g maleic anhydride, 0.57 g phosphoric acid, and 2 g sodium hydrogensulfite are placed in the reaction vessel and stirred for 1 hour at 80° C. in a nitrogen stream. Subsequently, 70.5 g 50% sodium hydroxide solution is slowly added thereto, and a solution of 133.6 g acrylic acid in 141.9 g water is metered over a period of 5 hours at 80° C., and solutions of 8.1 g 35% hydrogen peroxide in 37.6 g water and 2.85 g sodium sulfate in 40 g water are evenly added within a period of 6 hours. Then the batch is subjected to a final heat treatment for 2 hours. The polymer solution has a solids content of 37.7% and a viscosity of 1 55 mPa.s.

Comparative Example 3
(according to DE 40 03 172 A1, Example 25)

290 g maltodextrin MD 14 (dextrose-equivalent-value 14, from Avebe), 470 g water, 4.2 ml 0.1% aqueous solution of iron(II)ammonium sulfate, 101.4 g maleic anhydride, and 74.5 g sodium hydroxide are placed into the reaction vessel and heated to the boil. When the boiling starts, a mixture of 1 20 g acrylic acid and 132.7 g of a 50% aqueous solution of the sodium salt of acrylamidomethylpropane sulfonic acid is dosed within a period of 5 hours, and 80 g 30% hydrogen peroxide and a solution of 24 g sodium persulfate in 72 g water is dosed within 6 hours, keeping the temperature at the boil of the mixture. After the end of the last initiator dosage, a final heat treatment is carried out for 1 hour. Then neutralization is effected with 1 55 g 50% sodium hydroxide solution. A cloudy, brown solution is obtained which has a solids content of 45.2% and a viscosity of 560 mPa.s. Within a period of 14 days, a precipitate has deposited from the turbid solution.

EXAMPLE 9

Determination of the resistance to hard water amount of a 10% solution of graft copolymer is added to a test water having 33.6° dH [=German water hardness] (pure calcium hardness), boiled on a heating plate for 5 minutes and subsequently judged with respect to clarity, opalescence and turbidity. By varying the amount of graft copolymer, the concentration of gram product (solids content) per liter of hard water is d, i.e., the concentration at which after previous turbidity/opalescence a clear solution results for the first time. The results shown in Table 1 clearly demonstrate that the polymers according to the present invention can provide an effective and improved inhibition of boiler scale or similar deposits or precipitations of components of the hard water.

TABLE 1

| Product Example | Hard water resistance clear at (g solids/l) |
| --- | --- |
| 1 | 0.5 |
| 2 | 2.5 |
| 3 | 2.5 |
| 4 | 0.5 |
| 5 | 0.5 |
| 7 | 0.5 |
| 8 | 2.0 |
| Comparative Ex. 1 | >3.0 |
| Comparative Ex. 2 | 3.0 |

EXAMPLE 10

Determination of the calcium-binding-capability

The capacity of binding calcium is determined according to the so-called Hampshire-test, wherein the polymer is titrated with a calcium acetate solution in the presence of carbonate ions. The final value of titration is expressed in mg $CaCO_3$/g polymer.

Procedure: 1 g complexing agent (polymer according to the invention or comparative product) is dissolved in 50 ml dist. water, neutralized with sodium hydroxide solution, and 10 ml 2% sodium carbonate solution is added thereto; 100 ml are filled up and the pH is adjusted to 11.0. Titration is carried out with 0.25 ml calcium acetate solution until a sustained and distinct turbidity/precipitation occurs. The stage prior to turbidity is recognized by a slight opalescence, the transition is either narrow or broad depending on the complexing agent. The complexing power of some of the polymers according to the present invention is such high that, apart from an opalescence, no turbidity occurs.

TABLE 2

| Product Example No. | Calcium-binding-capacity according to Hampshire (mg CaCO₃/g polymer) |
| --- | --- |
| 1 | 1600 |
| 3 | 1184 |
| 5 | >1600 |
| 6 | 1374 |
| 7 | >1600 |
| polyacrylic acid | 710 |
| maleic acid/acrylic acid copolymer (30/70%-wt.) | 625 |
| Comparative Ex. 1 | 299 |
| Comparative Ex. 2 | 697 |

The polymers according to the present invention exhibit very high for the calcium binding power. If maleic anhydride (Comparative Examples 2 and 4) is additionally used, or in the absence of sulfonic-acid-groups-containing monomers (Comparative Example 1), polymers with a diminished calcium binding capacity are obtained.

EXAMPLE 11
Determination of the hydrophilic suspending capacity

The soil-carrying capacity of builders can be characterized by determining the hydrophilic suspending capacity. In this connection, the measure of the soil-carrying capacity is the suspending capacity towards pulverized iron oxide. The determination of the suspending power is effected by photometric turbidity measurement of a suspension consisting of the test substance, an iron oxide pigment, and the surfactant MARLON A (alkylbenzene sulfonate). In a shaking cylinder, the iron oxide is thoroughly shaken in an aqueous solution of the test substance under the addition of MARLON A, after 24 hours the intensity of the still existing turbidity is determined photometrically. The extinction $E_{450}$ at 450 nm in a 1-cm-cuvette is measured.

The established extinction values represent the measure for the hydrophilic suspending capacity. Products having a high suspending activity stabilize the pigments in the aqueous phase and have high extinction values.

TABLE 3

| Polymer according to Example | Extinction $E_{450}$ |
| --- | --- |
| 2 | 150 |
| 3 | 60 |
| 5 | 160 |
| 6 | 170 |
| sodium tripolyphosphate | 140 |
| commercial product* of maleic acid/acrylic acid (30/70%-wt.) | 6 |

*Sokolan CP5 (BASF AG)

EXAMPLE 12
Incrustation behavior in a washing test

In a domestic washing machine cotton fabric was washed with a detergent powder formulation comprising 10%-wt. of polymer dry substance as builder. After 12 washings at 90° C. with water of 13° dH, the residual ash content of the fabric was determined. A commercial product of maleic acid/acrylic acid (30/70%-wt.) was used as comparative polymer. The inhibition of redeposition was determined in a Linitest-laboratory washing machine.

| Composition of the detergent powder: | |
| --- | --- |
| alkylbenzene sulfonate | 6% |
| fatty alcohol ethoxylate | 5% |
| powdery soap | 5% |
| sodium carbonate | 25% |
| sodium bicarbonate | 25% |
| sodium perborate | 15% |
| polymer (100% solid matter) | 10% |
| sodium sulfate | ad 100% |

TABLE 4

| Polymer | % Residual Ash | % Brightening |
| --- | --- | --- |
| Example 3 | 0.68 | 79 |
| Example 5 | 0.64 | |
| Commercial product | 0.85 | 76 |

EXAMPLE 13
Washing of dyed material

The use of the polymers according to the present invention is exemplified by means of a discontinuous washing of a cotton fabric which had been subjected to reactive dyeing. At first, the dyeing liquor is drained off followed by
1. rinsing with overflow at 60° C. for 10 min.
2. rinsing in fresh bath at 90° C. for 10 min.
3. allowing to stand with 1 g/l polymer acc. to Example 5 at 90°–95° C. for 10 min. rinsing at 45° C. for 15 min.

The cotton fabric has an intensive color, shows no bleeding and exhibits a good wash fastness.

The above-mentioned periods, temperatures and sequences are intended to be illustrative. The polymers according to the present invention can also be used under other washing conditions.

EXAMPLE 14
Behavior of the dispersing agents in highly alkaline liquor

Test solutions (500 ml liquor) of water with 24° dH, 10 g/l NaOH and the polymer according to the present invention are heated to boiling temperature, maintained at this temperature for 1 5 minutes and cooled. The liquor loss is compensated by the addition of water (20° dH).

Table 5 indicates the appearance of the solutions in dependence on the amount used and in comparison with commercial products I, II and III:

TABLE 5

| Amount used | 0.5 g/l | 1 g/l | 2 g/l | 3 g/l |
| --- | --- | --- | --- | --- |
| Product | | | | |
| product I | flocculate | flocculate | flocculate | clear |
| product II | flocculate | flocculate | opal-clear | clear |
| product III | opal-cloudy | clear | clear | clear |
| polymer acc. to Ex. 5 | opal-cloudy | clear | clear | clear |

Clear solutions are obtained, if quantities starting from:
3 g/l with I
2 g/l with II
1g/l with III 1 g/l polymer according to Example 5 are used.

EXAMPLE 15

Raw cotton ropes are boiled off with 5 ml acetic acid at a liquor ratio of 1:10 for 30 minutes. Subsequently, 200 ml of the liquor is cooled to 60° C. and each of the following is added:

0.5 g/l, 1.0 g/l and 2 g/l of polymer according to Example 5

0.05 g/l indanthrene blue BC Coll 20.0 ml/l NaOH, 50%, and 5.0 g/i hydrosulfite, conc.

After a residence time of 1 5 minutes (at 600° C.), the liquor was sucked off by a "Blauband-Filter"[blue-band-filter]. The polymers show a good dispersive action; in the concentrations used they prevent precipitation of flocculates.

EXAMPLE 16

At a liquor ratio of 1:20 and a temperature of 70° to 80° C. black-dyed PES-flake was treated with a liquor of 1 g/l polymer according to Example 5 and 1 g/l SOLOPOL DP (fatty amine ethoxylate, trade name of Chemische Fabrik Stockhausen GmbH, Krefeld) for 20 minutes; it was then subjected to hot and cold rinsing. Oligomers, color and fiber dust was removed from the fibers.

EXAMPLE 17

Bleaching of 100% cotton linter having a degree of whiteness of 29.5 (according to Elrepho) was conducted in a bath having a liquor ratio of 1:20 each, comprising the following treatment steps Step 1

Treatment with a liquor of 1 ml/l HCl, conc. (37%)

2 ml/l of a combination comprising:
    42.0 parts of the polymer according to the present invention of Example 5 in acidic final adjustment
    10.0 parts of lactic acid
    25.0 parts of gluconic acid
    4.0 parts of phosphonic acid
    14.0 parts of a C12-C18 fatty alcohol polyglycol ether sulfate and
5 parts of a foam-suppressing EO-PO-block polymer was effected at 25° C. within 30 minutes.

Step 2

A) Treatment with a liquor of 10 ml/l NaOH, 50%

2 g/l Lavoral S313 (commercial product of Chemische Fabrik Stockhausen GmbH)

45 minutes at 95° C.

B) Treatment with a liquor of 10 ml/l NaOH, 50%

2 g/l of the combination acc. to step 1

45 minutes at 95° C.

C) Treatment with a liquor of 10 ml/l NaOH, 50%

2 g/l of the polymer acc. to the invention of Example 5 was carried out within 45 minutes at 95° C.

Step 3

Treatment with a liquor of 3 ml/l of the combination acc. to step 1

8 ml/l hydrogen peroxide, 35% was effected within 45 minutes at 95° C.

The hydrogen peroxide has previously been diluted in a solution of the combination acc. to step 1 and a partial amount of water and added slowly in hot condition.

The liquor is drained off and the material is hot-rinsed at 80° C. under the addition of 2 ml/l polymer according to Example 5.

The degree of whiteness of several samples amounted to between 69 and 70%.

EXAMPLE 18

At a temperature of 10° C., 20 mg iron(III)-sulfate and 4 g sodium disulfite and 5 g t-butyl hydroperoxide (70%), each dissolved in 17.8 g water, are added to a mixture of 334.6 g dist. water, 248.9 g acrylic acid, 50.4 g tartaric acid, 64.5 g sodium methallyl sulfonate, and 107.6 g methoxy polyethylene glycol methacrylate (20 moles EO) (60% solution in water). The temperature rises to 53° C. due to the starting polymerization reaction. The temperature is elevated to 70° C. by means of a heating bath, whereupon two solutions of 14 g sodium persulfate and 10 g sodium disulfite in 50 g water each,are added dropwise over a period of 1 hour. At the end,the polymer is neutralized with 50% sodium hydroxide solution. The clear polymer solution has a dry substance contents of 42.2% and a viscosity of 720 mPas.

EXAMPLE 19

Modifying Example 4, 56.1 g sodium gluconate were used instead of triglycerol, and the water amount is increased to 334.6 g. The polymerization was initiated at 15° C. by adding 20 mg iron(II)-sulfate, 4 g sodium disulfite, and 5 g t-butyl hydroperoxide (70%), each dissolved in 17.8 g dist. water. On reaching 62° C., the temperature was elevated to 73° C. by means of a heating bath, and the dosage of 17 g t-butyl hydroperoxide (70%) and 10 g sodium disulfite, each dissolved in 50 g water, was started over a period of 1 hour. After termination of the polymerization, neutralization was effected with 50% sodium hydroxide solution. The final product is a clear solution having 42.8% dry substance, and the resistance to hard water amounts to 0.5 g solids/l.

EXAMPLE 20

Modifying Example 19, 50 g of a citric acid ester of polyglycerol was used instead of 56.1 g sodium gluconate. The citric acid ester had been prepared by direct condensation of 0.3 mole of polyglycerol with 1.5 moles of citric acid (according to PCT/EP92/00512, page 12, Ex. 1), with the resulting condensation water being removed by azeotropic distillation.

EXAMPLE 21

Modifying Example 4, the triglycerol was replaced by glycerol. Initiation of the polymerization was effected after the addition of 10 g mercaptoethanol and 30 mg iron(II)-sulfate at 15° C. by means of 8 g t-butyl hydroperoxide (70%) and 6 g sodium disulfite, each dissolved in 1 7.8 g water. After a temperature increase to 100° C., the mixture is allowed to cool to 78° C. and then two solutions of 17 g t-butyl hydroperoxide (70%) and 10 g sodium disulfite, each dissolved in 66 g water, are added within 1 hour. After cooling, neutralization was effected with 50% sodium hydroxide solution. The final product is a clear solution having 44.1% dry substance and a resistance to hard water of 0.5 g solids/l.

EXAMPLE 22

Modifying Example 21, the weight amount of sodium methallyl sulfonate was replaced by acrylamidopropane sulfonic acid and the amount of mercaptoethanol reduced to 2 g. Initiation of the polymerization was effected with 20 mg iron(II)-sulfate, 4 g sodium disulfite, and 5 g t-butyl hydroperoxide (70%).

The final product was a clear solution having 42.5% dry substance and a resistance to hard water of 0.5 g solids/l.

EXAMPLE 23

180 g dist. water, 124.4 g acrylic acid, 32 g 50% sodium hydroxide solution, 303.5 g 41% acrylamide solution, 64.5 g sodium methallyl sulfonate, 46.2 g glycerol, and 107.5 g of a 60% solution of methoxypolyethylene glycol methacrylate (20 moles EO) are dissolved with one another, and then are added 20 mg iron(II)sulfate and 4 g sodium disulfite, dissolved in 17.8 g water, and 5 g t-butyl hydroperoxide (70%), dissolved in 17.8 g water. The temperature rises from 15° C. to 100C. and drops again. Starting at a temperature of 75° C., 17 g t-butyl hy10 g s(70%) and 10 g sodium disulfite, each dissolved in 50 g water, are metered thereto over 1 hour. After the end of polymerization, neutralization is effected with sodium hydroxide solution. The polymer has a dry substance of 42.1%, a viscosity of 280 mPas, and a resistance to hard water of 0.5 g solids/l.

EXAMPLE 24

250.2 g acrylic acid, 64.3 g sodium hydroxide solution (50%), 88.5 g sodium methallyl sulfonate, and 1 76.9 g glycerol are dissolved in 281 g dist. water, then 6.95 g mercaptoethanol, 0.0312 iron(II)-sulfate are added. A temperature of 18° C. is adjusted and the polymerization started by adding 4.72 g hydrogen peroxide (35%). After 10 minutes, the temperature maximum of 96° C. is reached; the mixture is allowed to cool to 75° C., and at this temperature the dosage of two solutions of 12.6 g sodium persulfate, in 59 g water, and 2.5 g sodium disulfate, in 59 g water, is effected. Cooling and neutralization with 163.3 g sodium hydroxide solution (50%) is effected at the end. The polymer has a bright color, a dry substance contents of 46.2%, a pH-value of 5.7, and a viscosity of 240 mPas.

EXAMPLE 25

A polymer of 50%-wt. sodium acrylate, 15%-wt. sodium methallyl sulfonate, 5%-wt. methoxy polyethylene glycol methacrylate, and 30%-wt. glycerol was produced. The colorless, clear, aqueous polymer solution had a dry substance contents of 45.8%, a viscosity of 133 mPas, and a pH-value of 5.5.

EXAMPLE 26

A polymer of 76.1%-wt. acrylic acid, 15.7%-wt. sodium methallyl sulfonate, and 8.2%-wt. glycerol was built up. The aqueous, colorless and bright polymer solution had a pH-value of 5.5, a dry substance contents of 42.8%, and a viscosity of 117 mPas.

EXAMPLE 27

Peroxide stabilization in bleaching liquors

The stabilizing action of sequestering agents towards the liquor is to be tested in this experiment. Quantities of minerals corresponding to an average cotton and a sequestrant and a complexing agent, respectively, are added to the liquor. The bleaching liquor was prepared in soft water with the following additives:

| | |
|---|---|
| 1.0 g/l | wetting agent (mixture of isotridecyl alcohol ethoxylate and alkane sulfonate) |
| 0.2 g/l | magnesium chloride |
| 1.0 g/l | stabilizer |
| 4.0 ml/l | sodium hydroxide solution (50%) |
| 8.0 ml/l | hydrogen peroxide (35%) |

The residual peroxide content is determined permanganometrically after certain periods/temperatures which are listed in the following Table. Batches with stabilizers of the polymer of Example 1 according to the present invention, with water glass (as state of the art), and a blank without stabilizers are compared. The good peroxide-stabilizing property of the polymer according to the present invention can be recognized:

| Time (min.) | Temperature (°C.) | Residual peroxide content of the liquor (%) | | |
|---|---|---|---|---|
| | | Sodium water glass | Ex.1 | blank |
| 0 | 20 | 100 | 100 | 100 |
| 20 | 70 | 48.8 | 80.3 | 59.1 |
| 40 | 98 | 3.0 | 13.2 | 7.1 |
| 55 | 98 | 0.8 | 1.8 | 0.8 |
| 70 | 98 | 0.5 | 1.0 | 0.0 |

EXAMPLE 28

Chromium exhaustion in leather production In chrome tanning chromium salts are fixed on the leather in the presence of polymers. The success of the chrome tanning is confirmed by a high chromium-uptake through the leather and a high shrinking temperature of the leather. The chromium uptake of the leather is determined indirectly by the chromium salt remaining in the liquor and is referred to as exhaustion. Shrinking temperature means the temperature at which the leather starts to shrink. The following Table shows the chromium contents of the tanning liquor, the exhaustion calculated on this basis, and the shrinking temperature. A commercial acrylic acid/DIMAPA copolymer serves as comparison:

| Polymer | Chromium content of liquor (g Cr2O3/l) | | Exhaustion (%) | Shrinking temp. (°C.) |
|---|---|---|---|---|
| | after 3h | end of test | | |
| Comm. product | 2.28 | 0.81 | 64.5 | 95 |
| Ex. 24 | 3.19 | 0.61 | 80.9 | 95 |
| Ex. 2 | 2.84 | 0.61 | 78.5 | 94 |
| Ex. 26 | 2.77 | 0.40 | 85.4 | 94 |

By means of the polymers according to the present invention, a very high portion of chromium salt in the liquor is fixed in the leather, the chromium exhaustion must be considered as very good.

EXAMPLE 29

Retanning of leather

Leather properties, such as softness, grain tightness, levelness are influenced by the retannage. The following Table shows the results of a retanning test with polymers according to the present invention and with the commercial product of Example 28 used as comparison. Cattle hides (wet blue, 1.8–1.0 shaved substance) were used. The assessment of the test results is in the range of 1 to 5, with 1 representing the best value.

| Polymer | Softness | Grain tightness | Levelness |
|---|---|---|---|
| Commerc. prod. | 3–4 | 2 | 3 |
| Example 26 | 3–4 | 2 | 3 |
| Example 2 | 4 | 2 | 3–4 |

We claim:

1. A graft copolymer obtained by radical graft copolymerization of a monomer mixture consisting of:
   A) 45-96%-wt. of at least one monoethylenically unsaturated $C_3$-$C_{10}$ monocarboxylic acid or salt thereof with a monovalent cation;
   B) 4-55%-wt. of at least one monoethylenically unsaturated, sulfonic acid group-containing monomer, one monoethylenically unsaturated sulfuric acid ester, vinylphosphonic acid or salt thereof with a monovalent cation;
   C) 0-30%-wt. of at least one water-soluble, monoethylenically unsaturated compound modified with 2-50 moles of alkylene oxide per mole;
   D) 0-45%-wt. of at least one further water-soluble, radically polymerizable monomer;
   E) 0-30%-wt. of at least one other radically polymerizable monomer which is slightly soluble or insoluble in water;
with the sum of A) to E) equalling 100%-wt., in the presence of at least one polyhydroxy compound, reaction product thereof, derivative thereof or mixture thereof, wherein the content of said at least one polyhydroxy compound, reaction product thereof, derivative thereof or mixture thereof amounts to 1 to 60%-wt. of the total mixture.

2. A graft copolymer according to claim 1, wherein the content of said at least one polyhydroxy compound, reaction product thereof, derivative thereof or mixture thereof amounts to 5 to 40%-wt. of the total mixture.

3. A graft copolymer according to claim 2, wherein the content of said at least one polyhydroxy compound, reaction product thereof, derivative thereof or mixture thereof amounts to 5 to 30%-wt. of the total mixture.

4. A graft copolymer according to claim 1, wherein the polyhydroxy compound comprises at least one polysaccharide.

5. A graft copolymer according to claim 3, wherein the at least one polysaccharide is selected from the group consisting of starch, starch decomposition products, starch derivatives, cellulose, cellulose decomposition products and cellulose derivatives.

6. A graft copolymer according to claim 1, wherein the polyhydroxy compound is selected from the group consisting of polyvinyl alcohol, partially saponified polyvinyl acetates and partially hydrolyzed polyvinyl ethers.

7. A graft copolymer according to claim 1, wherein the polyhydroxy compound is selected from the group consisting of glycerol and polyglycerols.

8. A graft copolymer according to claim 5, wherein the polyhydroxy compound comprises a polyglycerol selected from the group consisting of diglycerol, triglycerol, monoisopropylidene diglycerol, and monoisopropylidene triglycerol.

9. A graft copolymer according to claim 1, wherein monomer A) comprises at least one compound selected from the group consisting of acrylic acid, methacrylic acid, and alkali, ammonium or amine salts thereof.

10. A graft copolymer according to claim 1, wherein monomer B) comprises at least one compound selected from the group consisting of allyl sulfonic acid, methallyl sulfonic acid, acrylamidomethylpropane sulfonic acid, vinyl sulfonic acid, sulfatoethyl(meth)acrylate, vinyl phosphonic acid, and salts thereof with monovalent cations.

11. A graft copolymer according to claim 1, wherein the water-soluble, monoethylenically unsaturated compound modified with alkylene oxide comprises allyl alcohol or an ester of an unsaturated carboxylic acid with an alcohol which has been modified with alkylene oxide.

12. A graft copolymer according to claim 9, wherein the unsaturated carboxylic acid is acrylic acid or methacrylic acid.

13. A graft copolymer according to claim 1, wherein monomer D) comprises at least one molecular-weight-increasing monomer selected from the group consisting of monomers having multiply monoethylenically unsaturated double-bonds and monomers having one ethylenically unsaturated double-bond and one additional functional cross-linking group.

14. A graft copolymer according to claim 1, wherein monomer E) comprises at least one compound selected from the group consisting of alkyl acrylates and methacrylates, hydroxyalkyl acrylates and methacrylates, monoalkyl and dialkyl esters of maleic acid, N-alkyl and N,N-dialkyl acrylamides and methacrylamides, and vinyl carboxylic acid esters.

15. A process for producing a graft copolymer comprising polymerizing a mixture of monoethylenically unsaturated monomers at a temperature of up to 200° C. in the presence of a radical polymerization initiator and from 1 to 60%-wt. of at least one polyhydroxy compound, reaction product thereof, or derivative thereof, based on the total weight of monoethylenically unsaturated monomer and polyhydroxy compound, reaction product thereof or derivative thereof, wherein the monoethylenically unsaturated monomer mixture consists of
   A) 45-96%-wt. of at least one monoethylenically unsaturated $C_3$-$C_{10}$ monocarboxylic acid or salt thereof with a monovalent cation,
   B) 4-55%-wt. of at least one monoethylenically unsaturated monomer containing sulfonic acid groups, one monoethylenically unsaturated sulfuric acid ester and/or vinyl phosphonic acid and/or the salts of these acids with monovalent cations,
   C) 0-30%-wt. of at least one water-soluble, monoethylenically unsaturated compound modified with 2-50 moles of alkylene oxide per mole,
   D) 0-45%-wt. of at least one additional water-soluble, radically polymerizable monomer,
   E) 0-30%-wt. of other radically polymerizable monomers which are slightly soluble or insoluble in water, with the sum of A) through E) totaling 100%-wt. of the ethylenically unsaturated monomer mixture.

16. A process according to claim 15, wherein the ethylenically unsaturated monomer mixture is polymerized in the presence of from 5 to 40%-wt. of at least one polyhydroxy compound, reaction product thereof, or derivative thereof, based on the total weight of monoethylenically unsaturated monomer and polyhydroxy compound, reaction product thereof or derivative thereof.

17. A process according to claim 16, wherein the ethylenically unsaturated monomer mixture is polymerized in the presence of from 5 to 30%-wt. of at least one polyhydroxy compound, reaction product thereof, or derivative thereof, based on the total weight of monoethylenically unsaturated monomer and polyhydroxy compound, reaction product thereof or derivative thereof.

18. A process according to claim 15, wherein only a part of the ethylenically unsaturated monomer mixture is present when polymerization is commenced, and the remainder of the monomer mixture is added in measured amounts during the polymerization.

19. A process according to claim 15, wherein the at least one polyhydroxy compound, reaction product thereof or derivative thereof is a polysaccharide selected from the group consisting of starch, starch decomposition products, starch derivatives, cellulose, cellulose decomposition products, and cellulose derivatives.

20. A process according to claim 15, wherein the at least one polyhydroxy compound is selected from the group consisting of polyvinyl alcohol, partially saponified polyvinyl acetates and partially hydrolyzed polyvinyl ethers.

21. A process according to claim 15, wherein the at least one polyhydroxy compound is selected from the group consisting of glycerol and polyglycerols.

22. A process according to claim 21, wherein the at least one polyhydroxy compound is a polyglycerol selected from the group consisting of diglycerol, triglycerol, monoisopropylidene diglycerol and monoisopropylidene triglycerol.

23. A method of binding multivalent metal ions comprising contacting a solution containing said ions with a graft copolymer obtained by radical graft copolymerization of a monomer mixture consisting of:

A) 45–96%-wt. of at least one monoethylenically unsaturated $C_3$–$C_{10}$ monocarboxylic acid or salt thereof with a monovalent cation;

B) 4–55%-wt. of at least one monoethylenically unsaturated, sulfonic acid group-containing monomer, one monoethylenically unsaturated sulfuric acid ester, vinylphosphonic acid or salt thereof with a monovalent cation;

C) 0–30%-wt. of at least one water-soluble, monoethylenically unsaturated compound modified with 2–50 moles of alkylene oxide per mole;

D) 0–45%-wt. of at least one further water-soluble, radically polymerizable monomer;

E) 0–30%-wt. of at least one other radically polymerizable monomer which is slightly soluble or insoluble in water;

with the sum of A) to E) equalling 100%-wt., in the presence of at least one polyhydroxy compound, reaction product thereof, derivative thereof or mixture thereof, wherein the content of said at least one polyhydroxy compound, reaction product thereof, derivative thereof or mixture thereof amounts to 1 to 60%-wt. of the total mixture.

24. A method according to claim 23, wherein said solution is hard water and said method inhibits hardness of the water.

25. A method according to claim 23, wherein said graft copolymer is used in combination with at least one complexing carboxylic acid.

* * * * *